United States Patent [19]

Hackett et al.

[11] 4,423,890

[45] Jan. 3, 1984

[54] WELDED TUBE TO WALL JUNCTION

[75] Inventors: Charles D. Hackett, Tunnel Hill, Ga.; James R. Bray, Henegar, Ala.

[73] Assignee: Combustion Engineering, Inc., Windsor, Conn.

[21] Appl. No.: 213,701

[22] Filed: Dec. 8, 1980

[51] Int. Cl.³ .......................... B23K 9/00; B23K 35/16
[52] U.S. Cl. .................................... 285/189; 228/135; 228/189; 228/246; 285/286
[58] Field of Search ............... 228/136, 135, 165, 166, 228/167, 168, 189, 246, 249; 29/157.4; 285/189, 286

[56] References Cited

U.S. PATENT DOCUMENTS 1,703,037  2/1929  Heck .................................... 228/136
3,078,551  2/1963  Patriarca et al. ............... 228/165 X

FOREIGN PATENT DOCUMENTS 54-23047  2/1979  Japan .................................... 228/166

Primary Examiner—Kenneth J. Ramsey
Attorney, Agent, or Firm—Arthur L. Wade

[57] ABSTRACT

A welding machine lays down its welding bead at the juncture of two surfaces, back of which a pressure boundary has been formed. A depression, or groove, is provided at the juncture of the two surfaces. The weld bead bridges over the groove to form a junction of the two surfaces, leaving the bottom of the groove above the pressure boundary to function as a passage for materials at the surfaces which vaporize at the temperature of the welding operation. The escape of the gases through the passage obviates the gases bubbling up through, and deteriorating, the solidifying weld material forming the junction.

1 Claim, 4 Drawing Figures

WELDED TUBE TO WALL JUNCTION

TECHNICAL FIELD

The present invention relates to the control of vaporized material, generated by the high temperature of welding, to avoid degradation, or loss of integrity, of the weld bead by the vaporized material. More particularly, the invention relates to providing a passage beneath a molten weld bead, and over a pressure boundary between the surfaces welded, for the escape of vaporized surface material.

BACKGROUND ART

Welding processes utilize extremely high temperatures to liquify the weld material and structures joined to each other through the strength of the solidified weld material. At these high temperatures, which range up to 3,000 F., the molten metal at the electric arc generated by the welding machine, vaporizes contaminating surface materials on the structures being joined by the welding. Flux material and inert gases are provided by ingenious arrangements to shield, or submerge, the materials brought to a molten state by the electric current of the welding machine. However, for all the shielding efficiency of the inert gas and/or flux, a source of gas is generated below the molten material of the bead which threatens the integrity of the bead by penetrating upwardly through the solidifying material of the bead.

The shop practice of assembly commonly involves a high degree of handling of the parts prior to their final welding. In addition to scale on the surfaces of the parts to be welded, there are fluid contaminants, such as oil and grease, which are readily vaporized at the temperatures necessary for welding. Removal of these contaminants lurking on the surfaces of parts to be welded is often difficult. Solvents and mechanical scrubbing may be inadequate and the surfaces to be welded inaccessible. For whatever reason vaporization contaminants remain on the surfaces to be welded, if a pressure boundary is created below the juncture of the surfaces, the vaporized contaminants will tend to rise through the molten material of the weld and destroy its integrity.

A representative problem solved by the present invention is found in seal-welding boiler tubes in their holes within headers and drums of the utility boiler. The problem is universal, but has a particularly blatant form in the environment of the tube-to-drum wall.

DISCLOSURE OF THE INVENTION

The present invention contemplates forming a junction, by welding, which bridges the juncture of two surfaces, beneath which a pressure boundary has been formed, which boundary prevents the relief of vaporized material on the welded surfaces. A groove is formed at the juncture of the surfaces which the weld bead bridges in forming the junction, the passageway functioning to draw off the vaporized surface material and obviating the gas rising to penetrate and, thereby, destroying the integrity of the weld bead.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

General

Figure 1:
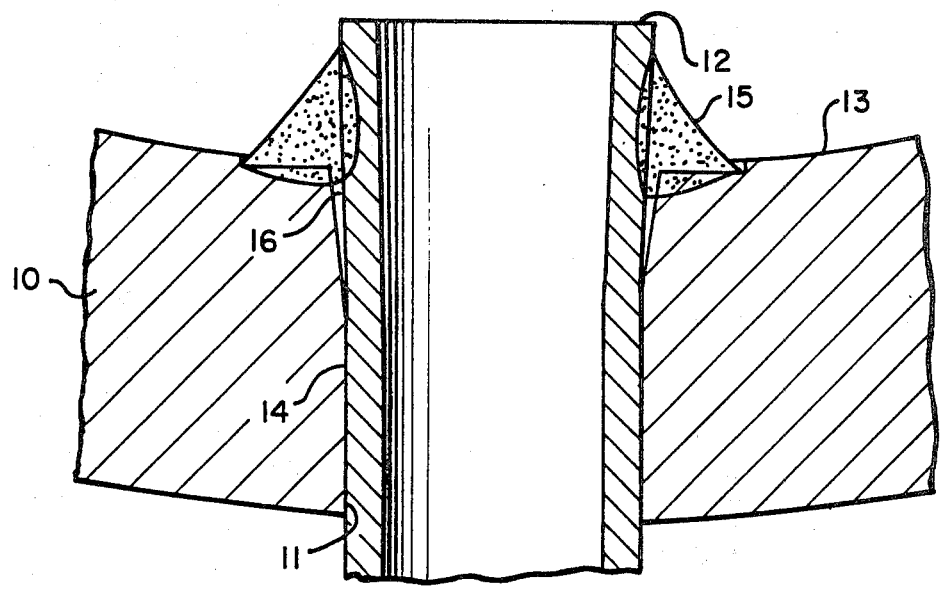
FIG. 1 is a sectioned elevation of a weld junction between a tube and grooved wall embodying the present invention.

The concepts of the present invention center about the provision for a passageway beneath a fillet of molten weld material as the bead of this material is layed at the juncture of two surfaces having a pressure boundary below the passageway. Fillet welds are commonly formed between two surfaces being joined by the solidified weld bead. However, there has never been a positive provision for, and preservation of, a passageway beneath the molten weld material, and above a pressure boundary, at the juncture of the surfaces to be joined to enable generated gases beneath the weld bead to be vented as the bead formation progresses. The present invention's concept includes the provision of a deformation of at least one of the surfaces at the juncture to provide the groove, or passageway, necessary to carry out the objects of the invention.

The drawing disclosure will first illustrate the arrangement of a tube end roll-expanded into position within its hole in the wall. In preparation for the formation of the fillet weld to form the junction, the edge of the surface about the tube is deformed, or a part of it removed, to form a depression deep enough to avoid the molten weld material flowing into and filling the void. Once this broad concept of the invention is illustrated, the disclosure moves on to a reduction to practice of the invention which includes the mounting of an insert ring in a counterbore about the tube end. The reason for the ring, and details of its mounting, will be set forth to culminate in the formation of a plurality of grooves in the ring body which will ventilate gases from beneath the molten weld material.

Wall Surface Groove

FIG. 1 is established to illustrate the broadest concept of the invention. A section of a drum wall 10, containing tube hole 11, is disclosed with the end of tube 12 positioned therethrough. The end of tube 12 is extended up into the interior of the drum of wall 10 above surface 13 and has been roll-expanded prior to welding the tube and wall together.

It must be initially appreciated that the roll-expansion has established a pressure boundary at 14 between the outside wall of the tube 12 and the inside wall of hole 11. Therefore, any gas generated at the tube surface and drum surface 13 cannot flow between these two surfaces brought together in a pressure boundary by roll-expansion.

Fillet weld bead 15 bridges between the wall surface 13 and the wall surface of tube 12. The present invention provides a deformation of surface 13, or a cutting away of surface 13, at the edge of hole 11. In effect, the angle between the tube and wall surfaces is deepened to insure the fillet weld material will not penetrate to the bottom and eliminate the passageway 16. As the heat of the welding process vaporizes surface material beneath the weld bead, and above the pressure boundary, the gases will continuously vent through passageway 16.

Insert Ring

Figure 2:
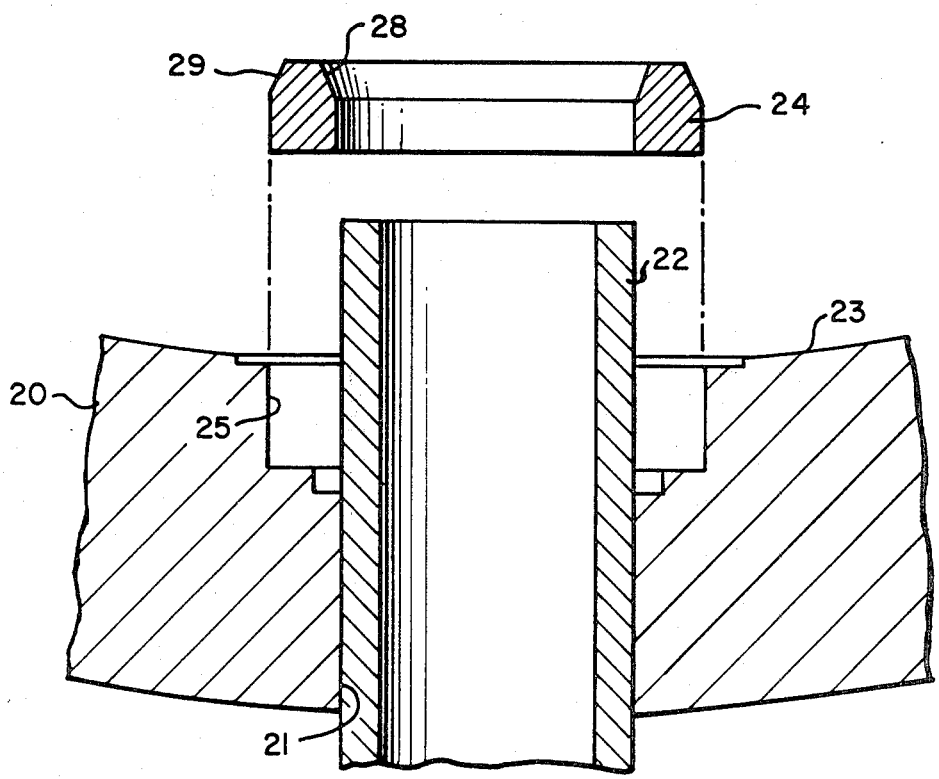
FIG. 2 is a sectioned elevation of a tube and wall juncture with an insert ring exploded.
Figure 3:
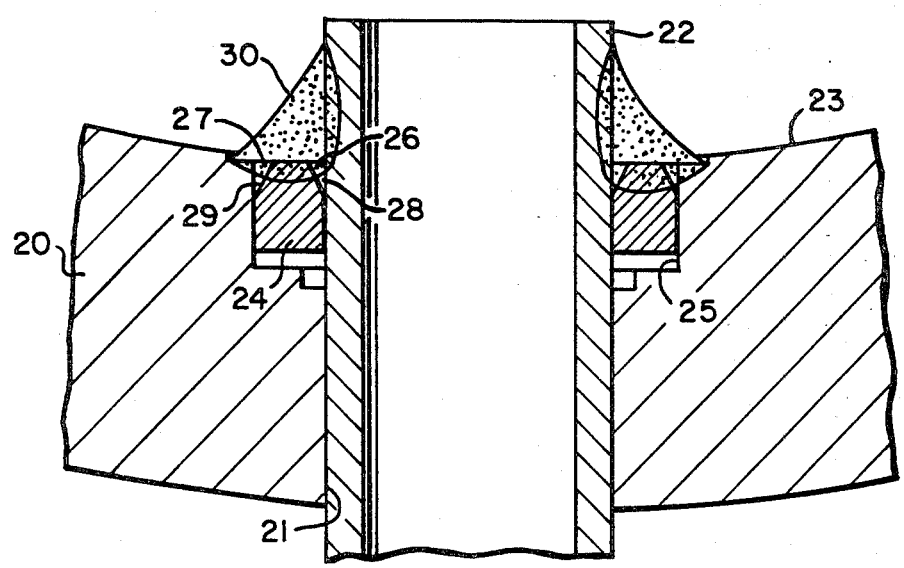
FIG. 3 is the structure of FIG. 2 with the insert ring in place within the junction.

FIGS. 2 and 3 are established to dramatize the relationship between an insert ring of material required to become a part of the weld bead run between a tube wall and drum surface. FIGS. 2 and 3 begin, again, with a fragment of drum wall 20. Hole 21 is formed through wall 20 and tube 22 protrudes above surface 23. FIG. 2 discloses tube 22 in position and ready to receive insert ring 24 which is shown in explosion above the end of tube 22. In preparation for the reception of insert ring 24, a counterbore 25 has been formed in wall 20 and that part of surface 23 has been cleaned, or spot-faced, about counterbore 25 to receive the weld bead. Further, as in FIG. 1, tube 22 is roll-expanded which establishes a pressure boundary between the outside surface of the tube and the surface of the hole 21.

Insert ring 24 is sized to slip over the end of tube 22 and fit into counterbore 25. FIG. 3 discloses the ring positioned within counterbore 25. The tube 22 is, again, roll-expanded with ring 24 in position, establishing a second pressure boundary between the inside wall of the ring and the tube wall.

The invention provides a passageway at 26 and a second passageway at 27 above the pressure boundary between the tube 22 wall and both the inside wall of the ring 24 and the inside wall of the hole 21. The passageway 26 is formed by bevel 28 on the inside upper wall of ring 24 and bevel 29 on the upper outside wall of ring 24. The fillet weld bead 30 is then laid down to form a junction between the outside wall of tube 22 and the drum wall surface 23, while maintaining both vent passageways 26 and 27 for vaporized material above the pressure boundaries.

Weld Completion

Figure 4:
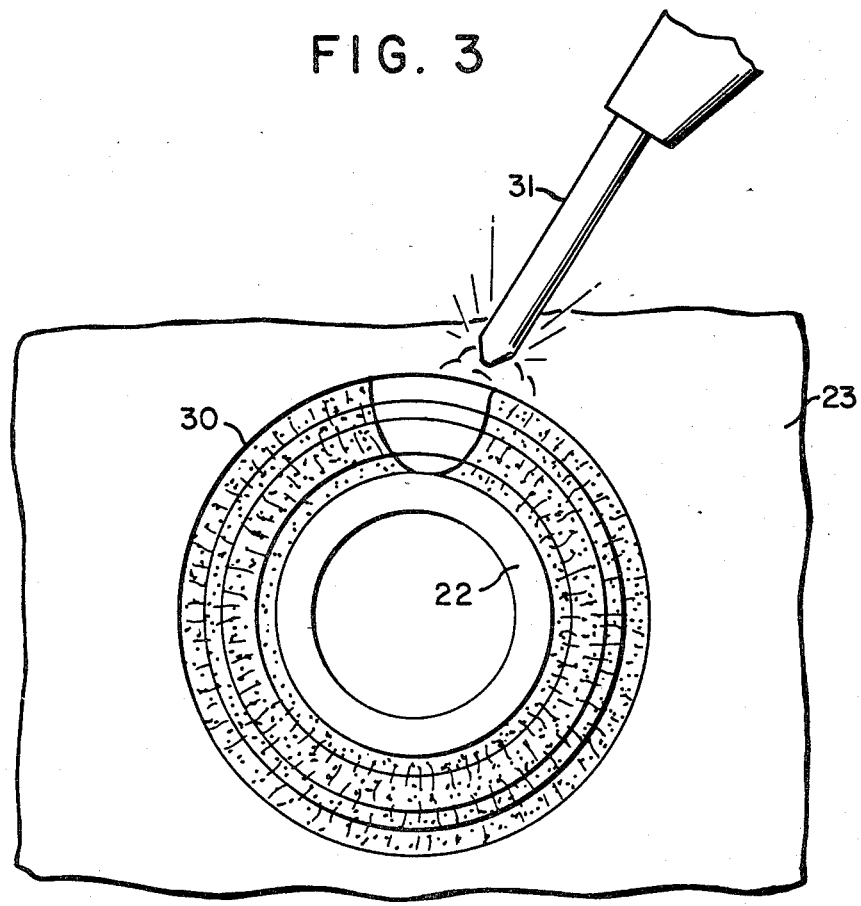
FIG. 4 is a plan view of the structures of FIGS. 1-3 as the junction is nearing completion.

FIG. 4 is an overview of a single run of welding bead around the tube as it extends up through the inner surface of a steam drum, or header. Utilizing the passageways, a single pass of the welding electrode 31 at the intersection of the outer surface of tube 22 and the inner surface of the drum wall surface 23 will complete the union. The formation of weld bead 30 is shown as nearing completion. At this point, practically all of the gas-forming material has been vaporized by the heat of the welding process and continuously passed from beneath the solidifying bead through the passageway, or passageways, provided by the invention. The final event is the completion of the weld 30 from the status disclosed by FIG. 4.

Conclusion

There may be some virtue in restating what the foregoing disclosure has made obvious. The presence of an insert ring is not critical to the practice of the invention. However, creation of the passageway, or passageways, is feasible by providing the bevels as disclosed in FIGS. 2 and 3. The concept of providing the passageways by a specific distortion, or removal, of material at the juncture of two surfaces to be joined by welding above a pressure boundary, becomes the raison d'etre of the invention. However formed, the void is not filled by the weld material in joining the surfaces, but remains, to the end, a vent for gas which would otherwise greatly reduce the quality of the weld.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A welded junction between the external surface of a tube and the surface of a drum wall, including,
   a drum wall with an internal surface,
   a tube hole through the drum wall,
   a tube positioned within the tube hole and extending above the surface of the wall with a pressure boundary between the outside surface of the tube wall and the inside surface of the tube wall and the inside surface of the tube hole,
   a counterbore from the internal surface of the drum and about the tube hole,
   an insert ring positioned within the counterbore and about the tube with a pressure boundary between the ring and tube,
   a first bevel on the upper edge of the inside surface of the ring forming a groove at the juncture of the ring and tube and above the pressure boundary,
   a second bevel on the upper edge of the outside surface of the ring forming a groove at the juncture between the groove and counterbore above the pressure boundary between the tube and the inside wall of the tube hole,
   a weld bead extending from the drum wall surface to the tube surface and over the two grooves formed by the ring, bevels, wherein the grooves provide ventilating passageways for vaporized surface materials to avoid penetration of the weld bead in its molten state.

* * * * *